United States Patent [19]

Uozu et al.

[11] Patent Number: 4,849,187

[45] Date of Patent: Jul. 18, 1989

[54] STEAM REFORMING APPARATUS

[75] Inventors: Hisahiro Uozu; Akio Naitoh; Toru Numaguchi, all of Chiba, Japan

[73] Assignee: Toyo Engineering Corporation, Tokyo, Japan

[21] Appl. No.: 173,997

[22] Filed: Mar. 28, 1988

[30] Foreign Application Priority Data

Mar. 31, 1987 [JP] Japan .................................. 62-75956
Mar. 17, 1988 [JP] Japan .................................. 63-64409

[51] Int. Cl.⁴ ............................. B01J 1/00; B01J 8/04
[52] U.S. Cl. ........................................ 422/197; 48/94; 122/28; 422/204
[58] Field of Search ................... 122/28, 21; 431/328; 422/197, 204; 48/94

[56] References Cited

U.S. PATENT DOCUMENTS

| | | | |
|---|---|---|---|
| 4,098,587 | 7/1978 | Krar et al. | 48/94 |
| 4,282,832 | 8/1981 | Szydlowski et al. | 122/28 |
| 4,692,306 | 9/1987 | Minet et al. | 48/94 X |
| 4,714,593 | 12/1987 | Naitu et al. | 422/197 |

Primary Examiner—Edward G. Favors
Attorney, Agent, or Firm—Flynn, Thiel, Boutell & Tanis

[57] ABSTRACT

An apparatus for an endothermic reaction of a gas such as steam reforming having a cylindrical vessel which is provided therein a fuel gas supply room, a combustion catalyst holding wall, a flue gas passage room, and a reaction room, all of which are cylindrical or annular and coaxially piled in this order, the catalyst holding wall having a combustion catalyst holding layer on a flue gas passage room side thereof and the reaction room having a product gas passage; whereby a mixture of a fuel gas and an oxygen containing gas passes through the catalyst holding wall from the supply room into the flue gas passage room, being burnt by the catalyst to become a flue gas and to generate combustion heat, and the flue gas is discharged while the heat is given to the reaction room mainly by radiation from the catalyst layer; a raw material gas passes through the reaction room reacting endothermically to become a product gas, which is discharged through the product gas passage in countercurrent heat exchange arrangement with the raw material gas passing through the reaction room.

20 Claims, 7 Drawing Sheets

STEAM REFORMING APPARATUS

BACKGROUND OF THE INVENTION

1. Field of the Invention

This invention relates to an apparatus for an endothermic reaction of a gas represented by steam reforming in which the heat of combustion generated in the space for producing flue gas of the smallest possible volume is imparted to the reactants in the reactor for such reaction through the wall of the reactor as a heat flux of high density.

2. Description of the Prior Art

In order that the heat of combustion generated in the space or room for producing flue gas is imparted to the reactants or raw material gas through the wall of the reactor as a heat flux of high density, it is a common practice for gaseous endothermic reaction apparatus such as steam reforming apparatus to maintain the temperature of the flue gas in the space for producing flue gas as high as possible, to maximize the thickness of the flue gas layer, to maximize the reflectance of heat rays at the inner surface of the combustion furnace defining the space for producing flue gas, etc.

Even if these means are applied collectively, the heat flux penetrating through the wall of the reactor is about 150,000 Kcal/m$^2$·hr at the highest in an industrial apparatus.

Increased thickness of the flue gas layer will cause the volume of the combustion furnace to be inevitably large, so that the resulting whole apparatus will necessarily be increased in size even if the volume of the reactor itself which is housed in and heated by the combustion furnace is small.

It has been practiced to reduce the volume of the combustion furnace by placing in the combustion furnace a refractory solid material having much larger emissivity than gases at high temperatures and heating the solid material with the flue gas to maintain it at high temperatures so as to make it emit heat rays from the solid material to the wall of the reactor. Further, it has also been proposed for the same purpose to make use of the heat of combustion generated by the catalytic oxidation of fuel.

SUMMARY OF THE INVENTION

It is an object of the present invention to provide an endothermic reaction apparatus such as a steam reforming apparatus having a large capacity in spite of holding as small a volume as possible.

The apparatus of the present invention is summarized as follows.

In a vertical cylindrical vessel, there are provided:

an annular endothermic reaction room, having two cylindrical walls coaxial with the vessel, a gas permeable, cylindrical combustion catalyst holding wall holding a combustion catalyst holding layer on a side thereof which side faces the reaction room, which wall being adjacent to at least one of the cylindrical walls of the reaction room and coaxial with the vessel, a flue gas passage room being an annular room enclosed by a wall including the at least one of the cylindrical walls of the reaction room and the combustion catalyst holding wall, a product gas passage being in countercurrent heat exchange arrangement with the reaction room and connected to the same at an end thereof, a fuel gas supply room being on a different side of the combustion catalyst holding wall from the flue gas passage room, and enclosed by a wall including the combustion catalyst holding wall, raw material gas supply means connected to said reaction room at another end thereof, fuel gas supply means and oxygen containing gas supply means both connected to the fuel gas supply room, flue gas discharge means connected to the flue gas passage room, product gas discharge means connected to the product gas passage; whereby:

a fuel gas and an oxygen containing gas are supplied into the fuel gas supply room through the fuel gas supply means and the oxygen containing gas supply means respectively, wherein the two gases are separately supplied to the apparatus of the invention and then mixed together before or after entering into the supply room, or are supplied to the apparatus of the invention being mixed together in advance and then through common supply means; thereafter the mixed gases pass through the combustion catalyst holding wall into the flue gas passage room; and during the passing through, the fuel gas is burnt by the combustion catalyst; the heat generated by the combustion is brought to the reaction room by radiation from the combustion catalyst holding layer through the flue gas passage room and the at least one of the walls of the reaction room; a flue gas made by the combustion is discharged through the flue gas passage room and the flue gas discharge means, and the residual heat of the flue gas is also given to the reaction room through the at least one of the walls of the reaction room;

on the other hand, a raw material gas is supplied through the raw material gas supply means into the reaction room, passes therethrough and reacts endothermically to become a product gas, then the product gas is discharged through the product gas passage countercurrently with the raw material gas passing through the reaction room giving a residual heat thereof to the raw material gas through said product gas discharge means.

BRIEF DESCRIPTION OF THE DRAWING

FIG. 1 illustrates an example in which the apparatus of the present invention is embodied.

DETAILED DESCRIPTION OF THE INVENTION

In the apparatus of the present invention, a gaseous fuel or a liquid fuel supplied in a finely-atomized state is fed together with air, an oxygen-enriched air or other oxygen-containing gas to a combustion catalyst which is provided in the heating furnace of the apparatus and contains palladium, platinum or nickel as an active or effective component, where the fuel is submitted to catalytic combustion to generate the required heat of combustion under the precise control of temperature distribution within the combustion zone.

The endothermic reaction zone to be heated by the catalytic combustion consists of the wall of a reactor made of a material with a high mechanical strength, high heat resistance and high coefficient of overall heat transfer and a room or space enclosed therein where, if necessary, a catalyst bed for the endothermic reaction or a solid filling material is packed.

Adjuncts may be provided as required on the surface of the walls of the reactor enclosing the reaction zone.

For instance, they are studs and the like enlarging the inner or outer surface area of the walls of the reactor or reaction room.

The heat transfer surface of the reactor is faced to the combustion catalyst layer wholly or partially across a space necessary for the flue gas to pass to a discharge nozzle, which space may be referred to as "flue gas passage room".

The thickness of the flue gas passage room or the distance between the heat transfer surface of the reactor and the combustion catalyst layer is to be in the range of 5-200 mm.

The room serves to function as a flow passage of the flue gas formed by the catalytic combustion in the combustion catalyst layer.

The velocity of the flue gas in this room is favorably kept in the range of 0.1-5 m/sec.

The thickness of the combustion catalyst layer is desirably put in the range of 1-40 mm depending on the amount of heat required.

The combustion catalyst holding wall is constructed with a heat durable material of porous structure with sufficient mechanical strength. Such material may be ceramic or metallic solid of gas permeable structure such as net, wadding or padding, woven or non-woven cloth, net, fiber, string or cord, or open-cellular spongy structure.

The catalyst holding wall may be constructed with one of such material or a combination of a plurality of them, by the material itself or supported by certain framework, casing or the like.

The portion of the combustion catalyst holding wall holding no combustion catalyst is positioned on a side of the wall adjoining the fuel gas supply room.

The function of this portion is to prevent backfire from the combustion catalyst layer into the fuel gas supply room or further, and to insulate and reflect the heat from the combustion catalyst layer, and in some cases, to support the catalyst layer.

An additional wall may be installed on a side of the combustion catalyst holding wall which side being opposite with the catalyst layer, positioned apart from the catalyst holding wall to certain extent, to further prevent the backfire or to control the distribution, along the vertical direction, of the flow rate of the fuel gas mixture with the oxygen containing gas through the catalyst holding wall.

The additional wall may be of metal net, expanded metal or the like or combination thereof, varying the porosity, degree of opening or aperture, in some cases to control the flow rate mentioned above.

The backfire prevention means such as usual flame arrester may be further provided as required along the flow passage of the fuel gas mixture down to the combustion catalyst holding wall or the additional wall.

The heat generated in the catalyst layer is radiated by solid radiation therefrom to the reaction room through the flue gas passage room and the wall of the reaction room into the reaction room where the endothermic reaction of the raw material is achieved: Since the passing of the heat through the wall portion without combustion catalyst is prevented by the insulation function of that wall portion and the heat is reflected or radiated back to the catalyst layer, and the fuel mixture gas flowing through the wall portion also carries the heat into the catalyst layer, the combustion heat is brought to the reaction room in high efficiency.

For the preparation of the combustion catalyst layer, a refractory material of porous structure and also having a high mechanical strength may be immersed in a solution containing the catalyst component optionally after being wash-coated to ensure a large surface area to carry the catalyst component, or the concentration distribution of the catalyst component may be controlled in the catalyst layer by further or repeated immersion of the material in a solution containing the catalyst component, or a refractory material of granular or fibrous structure may be caused to carry the catalyst component optionally after being wash-coated to ensure a large surface area and formed into a desired shape of the catalyst layer. In this case, the carrying and the shape formation may be reversed in order.

In order to facilitate the heat radiation from the catalyst layer, it is very effective to arrange small carrier granules densely in the deep section of the catalyst layer and large carrier granules coarsely in the shallow section of the catalyst layer.

Similarly, it is also effective to arrange carrier fibers densely in the deep section and coarsely in the shallow section.

The shallow section is naturally on the side facing the heat transfer surface of the reactor.

For the purpose of the prevention of back fire, the surface of the combustion catalyst layer opposite to that facing the heat transfer surface of the reactor is covered with the layer of a refractory insulating material through which it is easy for the fuel and oxygen-containing gas to pass. This layer has been hereinbefore mentioned as "the wall portion without combustion catalyst" or "the portion of the combustion catalyst holding wall holding no combustion catalyst".

It is particularly preferable to use a composite refractory insulating material consisting of a shaped refractory material and a woven or nonwoven sheet made of ceramic fiber.

The shaped refractory material may be used in the layer near the combustion catalyst layer while the ceramic fiber layer in the layer distant therefrom. On the contrary, the shaped refractory material may also be used in the layer distant from the combustion catalyst layer while the ceramic fiber layer in the layer near the combustion catalyst layer.

The refractory insulating material layer may also assume a structure in which a shaped refractory material is held between ceramic fiber layers.

The refractory insulating material is required to be strong enough in mechanical strength when it functions as a supporting base material of the combustion catalyst layer in cases where the combustion catalyst layer itself is fragile.

When the combustion catalyst layer is carried on a strong refractory material, the refractory insulating material may be chosen principally on the basis of its insulating ability.

The thickness of the refractory insulating material layer is to be in the range of 0.5–20 mm with a view toward preventing back fire.

In order that the apparatus of the present invention may have high reliability, the refractory insulating material layer is the most important functional part.

The refractory insulating material layer may be of an integrated or single bodied structure, or may be of a combined structure of a material divided into blocks.

The material for the block is not necessarily limited to one kind but it may also be of a proper combination of different materials.

The pressure difference between the pressure in the flue gas passage room and the pressure in the portion, adjoining the combustion catalyst holding wall, of the space of the fuel gas supply room is to be at least 10 mm water pressure head for the prevention of backfire.

The surface temperature of the refractory insulating material layer at the entrance side of the fuel and oxygen-containing gas should preferably be maintained at temperatures lower than the ignition temperature of the fuel by about 200° C. in view of the prevention of backfire.

Where the fuel is methane by way of example, the surface temperature of the insulating material layer at the entrance side should preferably be not higher than 400° C.

It is suitable that the combustion catalyst is distributed uniformly on the whole surface of the combustion catalyst layer facing the outer surface of the reactor. However, it is not necessarily essential that the catalyst is present uniformly in the layer of the entrance side of the combustion catalyst layer, but is preferable that the catalyst exists more sparsely in the layer of the entrance side for the purpose of preventing backfire and catalyst degradation.

As the fuel and oxygen-containing gas pass through the catalyst layer, the amount of the flue gas resulting from the combustion of the fuel gas increases gradually.

It is effective to make the surface of the combustion catalyst layer facing the outer surface of the reactor a layer having a large blackness and thereby to accelerate the radiation of the heat generated by the catalytic combustion to the outer surface of the reactor.

In the apparatus of the present invention, it is possible to provide a static mixing section of the fuel gas and oxygen-containing gas in the interior thereof so that effluents from the mixing section is supplied to the refractory insulating material layer.

It is preferable to control the supply of the fuel and oxygen-containing gas to the combustion catalyst layer along the vertical direction precisely in accordance with the distribution of the load to be heated of the reactor along that direction.

The reaction carried out in the reactor is an endothermic reaction capable of continuing only at high temperatures and the reaction requires large amount of heat, so that it is necessary to feed large amount of heat with high efficiency to the reaction system continuously and steadily utilizing a limited effective area of the wall of the reactor for heat transfer to the system.

Figures 1, 2:
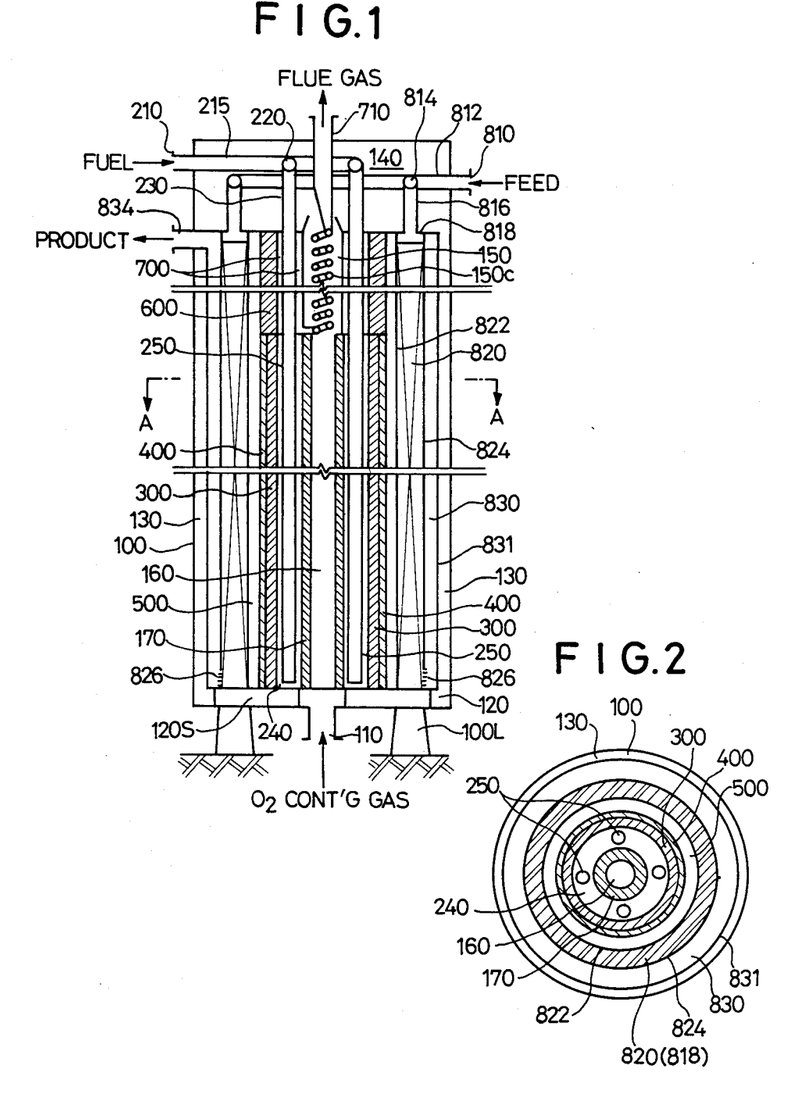
FIG. 1 is a longitudinal or vertical cross section of a cylindrical apparatus for the conversion of hydrocarbons to a gaseous mixture containing large amounts of hydrogen and carbon monoxide as active components by reacting the hydrocarbons with steam at high temperatures in the presence of a steam reforming catalyst.
FIG. 2 illustrates the horizontal cross section of the cylindrical apparatus at the line A—A in FIG. 1.

Referring to the drawings, in FIG. 1 and FIG. 2, a body 100 of the gasification reaction apparatus is a cylindrical vessel supported by legs 100L in the central part of which vessel a cylindrical or polygonal distribution pipe or cylindrical wall 170 for oxygen-containing gas is provided. An oxygen containing gas supply room 160 is surrounded by this wall.

The distribution pipe 170 in FIG. 1 is a gas-permeable porous pipe made of a sintered metal.

It is also feasible to use a single- or multi-layered pipe with a number of pores perforated on one or more layers of the pipe wall.

A multi-layer of tubular metallic nets with small mesh openings may also be used as the distribution pipe 170.

For the uniform distribution of an oxygen-containing gas passing through the pipe wall of the distribution pipe 170, the pressure loss of the oxygen-containing gas across the pipe wall is regulated to be at least 30% of the pressure difference between the pressure of the oxygen-containing gas fed to the apparatus and the pressure of the flue gas.

Around the distribution pipe 170, a plurality of distribution pipes 250 for gaseous or vapor fuel are disposed.

When the oxygen-containing gas is supplied to the distribution pipe 170 together with the fuel, the distribution pipes 250 may be used to function for the supply of additional fuel or may not be used at all.

The distribution pipes 250 are perforated in required sections with a number of small pores through which the fuel is ejected. (Pores are not shown in the drawing for brevity.)

The direction of the pore may be in any radial direction around the distribution pipes. Such directions as may be suitable for the mixing of the fuel and oxygen containing gases are selected.

The distribution pipes 250 may be made of porous material such as sintered metal.

The density distribution of the pores or openings or the size of distribution pipes 170 or 250 may be varied along the vertical direction for favorable distribution of the supply of the gases along that direction in order that the distribution of the combustion heat generated in the combustion catalyst layer hereinafter mentioned may be optimized for heating the reactor.

Around the space 240 in which the distribution pipes 250 are disposed and which are annular in horizontal cross section, a cylindrical gas-permeable partition wall layer 300 is provided.

The gas-permeable partition wall layer 300 is composed of a ceramic fiber non-woven sheet layer at the entrance side of the oxygen-containing gas and a shaped refractory porous rigid material layer of sufficient gas-permeability at the exit side thereof.

The refractory porous material layer of the gas-permeable partition wall layer 300 carries a combustion catalyst in the outermost section of the layer.

The catalyst holding layer 400 carrying the combustion catalyst has a thickness of at least 1 mm because the temperature of the section has to be maintained at desired high temperatures. Layers 300 and 400 make up a combustion catalyst holding wall.

The space having distribution pipes 250 therein is an annular gas mixing room 240, the fuel-gas-supplying room enclosed by a wall including the cylindrical wall 170 and the catalyst holding wall.

Although the combustion catalyst in FIG. 1 is carried on the outermost section of the refractory porous material layer, it may also be carried on a ceramic fiber nonwoven sheet, etc. independently so that the resulting sheet may be fixed onto the outer surface of the gas-permeable partition wall layer 300.

There is provided a flue gas passage room or space 500 which is the passage of the flue gas formed by the function of the combustion catalyst 400 and has an annular horizontal cross section.

The horizontal cross section of the space 500 should have a horizontal cross-section area sufficient for the flue gas to have a flow rate in the range of 0.1–5 m/sec so that the supply of the fuel and oxygen-containing gas may not be obstructed by the resistance against the flow of the flue gas.

An inner wall 822 of a gasification reaction chamber or room 818 is provided defining the outer bounds of the space 500.

The gasification reaction chamber or reactor 818 is arranged between the inner wall 822 and an outer wall 824, the horizontal cross section of the chamber being annular.

In the gasification reaction chamber 818 is installed a steam reforming catalyst bed 820 and at the lower end of the outer wall 824 are arranged a desired number of openings 826 for the discharge of the product gas.

Around the outer wall 824, a passage 830 for product gas having an annular horizontal cross section is formed surrounded by a cylindrical wall 831.

At the upper end of the passage or product gas recovery room 830 are provided a required number of discharge nozzles 834 for product gas to the outside of the apparatus.

Surrounding the passage 830, a passage 130 for oxygen-containing gas having an annular horizontal cross section is provided surrounded by vessel 100.

At the lower end of the apparatus is provided a feed nozzle 110 for oxygen-containing gas.

The oxygen-containing gas introduced through the feed nozzle 110 goes outward through passage 120, up through the passage 130 to a passage space 140 provided in the upper part of the apparatus, goes inward therethrough, and then passes through a heat exchanger space 150 for the recovery of waste heat, in which a heat-exchanger 150C is disposed, to flow into the room 160.

Passage 120 has supporting plates 120S being also radial flow guides for the gas.

The gaseous or vapor fuel reaches a circular manifold 220 through a nozzle 210 and main pipe 215 and is introduced into a plurality of the distribution pipes 250 through down pipes 230.

The fuel ejected from the openings of the distribution pipes 250 is mixed with the oxygen-containing gas, and the resulting mixture penetrates through the gas-permeable partition wall layer 300 to reach the combustion catalyst bed 400 where it is subjected to catalytic combustion.

The flue gas formed by the catalytic combustion goes up through the space 500, penetrates inwards through a gas-permeable insulating material layer 60. and thereafter passes through a heat-exchanger tube 150C to be discharged to the outside of the apparatus through the tube 710.

The insulating material layer 600 is a heat recovery wall. The wall 600 receives the residual heat of the flue gas and radiates the heat back into the flue gas passage room 500. In the embodiment in FIG. 1, the radiated heat is given to the reaction catalyst bed 820 through the room 500 and the inner wall 822 of the reaction room 818.

The heat recovery wall 600 is positioned at the exit end of the flue gas passage room, and may be parallel or normal, or inclined to the wall of the reaction room, inasmuch as the flue gas is discharged through this heat recovery wall. In the embodiment of FIG. 1 with parallel arrangement, the heat is rather directly brought to the wall of the reaction room.

Gaseous or vapor hydrocarbons or lower alcohols and steam as the raw material of the endothermic reaction are fed through a nozzle 810 and main pipe 812, into a circular manifold 814 where the mixture is diverged into a plurality of distributing pipes 816.

A plurality of the distributing pipes 816 are connected at equal intervals to the annular cover wall of the reaction chamber 818 at the upper end thereof.

While the reaction mixture flows down through the steam reforming catalyst bed 820 in the reaction room 818, the reaction proceeds by means of the heat flux generating through the inner wall 822 and the outer wall 824 to form a high-temperature product gas. The product gas then goes up through the annular passage 830, imparting its retaining residual heat to the reaction fluid in the catalyst bed 820 through the outer wall 824, and is thereafter discharged through a discharge nozzle 834.

The same numeral or symbol mentioned herein indicates the same object unless otherwise noted.

Figure 3:
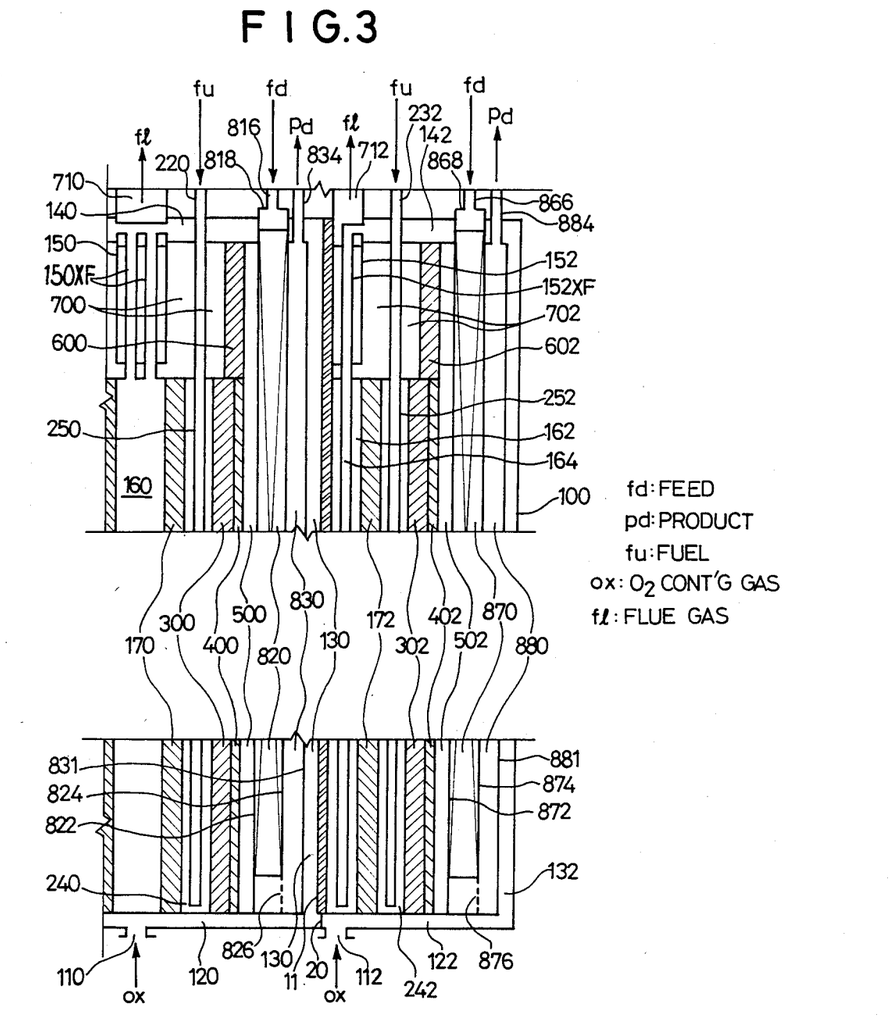
FIG. 3 is a brief partial vertical cross section of an embodiment with coaxial inner and outer annular reaction rooms each of which has respective one combustion catalyst holding layer on the inner side.

FIG. 3 shows a brief vertical cross section of an embodiment of the invention having a core unit similar to the embodiment in FIG. 1 and an annular unit around the core unit of a similar construction to the core unit. In the core unit, heat exchanger 150 has a finned-tube 150×F in whose tube the oxygen-containing gas flows through and the flue or burnt gas passes on its fin side.

The flue gas flowed out of the heat exchanger 150 is discharged through the central flue gas discharging tube 710.

Figure 4:
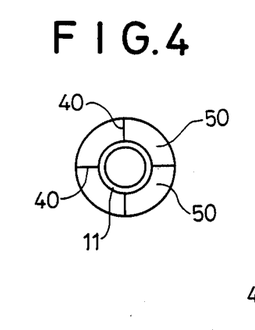
FIG. 4 is a simplified cross section of the embodiment with two annular reaction rooms or reactors and the blocks of annular unit.

As shown in FIG. 4, which is a very brief horizontal cross section of an embodiment similar to that illustrated in FIG. 3, the annular unit is favorably separated by two or more radial vertical walls 40 into the same number of arc-shaped blocks 50 for the convenience of fabrication, transportation, repair, or partial operation of the apparatus of the invention.

At least one annular structure section of the apparatus of the invention, i.e., a set of one of the annular room and a pair of the vertical cylindrical walls sandwiching the room may be separated similarly owing to the reason like above.

Figure 5A:
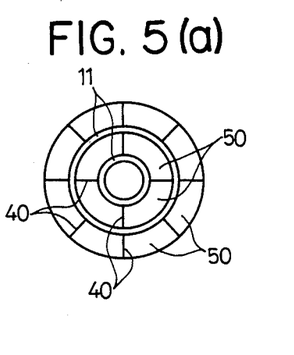
FIG. 5 shows embodiments with three sets of unit reactor assembly in simplified horizontal cross section, with 5a in full shape and with 5b a partial illustration further indicating a separatable blocks.

The core and annular units in FIG. 3 are separated by a wall 11 comprising heat insulation material. Heat insulating wall 11 may be disposed between two annular units illustrated in FIG. 5a showing a very brief cross section of an embodiment of the invention with three reaction rooms. The radial division wall 40 may also be heat insulating. Heat insulation thus arranged is convenient for the separate partial operation of only some portion of the units and/or blocks.

Figure 5B:
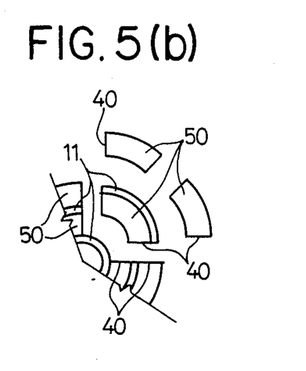

The core unit and each block of the annular units may be separatable as shown in FIG. 5b showing a partial cross section, which blocks are fabricated together to the apparatus of the invention.

In the annular unit in FIG. 3, the oxygen-containing gas from one or more entrance 112 flows through outward passage 122, which is separated by the cylindrical partition wall 20 which may be an extension of the heat insulating wall 11, rising passage 132, inward passage 142, and heat exchanger 152 for oxygen-containing gas into a plurality of pre-distributor means 164 for oxygen-containing gas. The heat exchanger 152 utilizes finned tubes 152×F. The pre-distributor 164 which may be of similar composition to the fuel distribution pipe 250 in FIG. 1, may be omitted in some cases.

The oxygen-containing gas spouts out of a lot of pores on the walls of pre-distributor 164, passes through the porous and gas permeable oxygen-containing gas distributor 172, a cylindrical wall, into the fuel-gas-supplying room or mixing room 242, mixed therein with the fuel gas spouted out of a lot of pores on the walls of fuel-gas distributor 252, then further mixed with it passing through the gas permeable wall layer 302 of the cylindrical combustion catalyst holding wall, and burns in the combustion-catalyst-holding layer 402 on the outer side surface of the combustion catalyst-holding wall.

For supplying and discharging gases, circular manifold as described for FIG. 1 or the same divided into segments are applied for the annular unit.

The combustion heat generated in the combustion-catalyst layer 402 is carried to the endothermic reaction catalyst bed 870 through the inner endothermic-reaction-room wall 872, mainly by the solid body radiation from the combustion-catalyst layer 402, and also partially by convection from the flue or burnt gas going up the flue gas passage room 502, since the gas permeable partition wall layer 302 plays a role of heat insulator and the fuel gas mixture flows from the fuel-gas-supplying room 242 to the flue gas passage room 502.

The burnt gas rises through the room 502 and goes out of it through the heat recovery wall 602 of gas-permeable solid material giving its heat to the wall 602, then the wall 602 radiates the heat by solid radiation to the catalyst bed 870, and the flue gas is discharged through annular room 702, fin side of the finned tube heat exchanger 152 pre-heating the oxygen containing gas comes down through the finned tube, and one or more tubes 712.

The raw material gas supplied through distributing pipes 866 into the reaction room 868, runs down through the reaction catalyst bed 870 changing gradually into a product gas receiving the heat from the combustion catalyst layer as mentioned above, and, at the bottom end of the reaction bed, turns into and goes up through the annular passage 880 between the outer wall 874 of the reaction room and a cylindrical wall 881, and discharged through tubes 884.

The core unit in FIG. 3 is operated similarly to the embodiment in FIG. 1.

In the embodiments mentioned above, the annular reaction room is heated from an annular combustion catalyst layer disposed at an inner position. Although such heating from the inside position of the reaction room is generally favorable, the reaction room may be heated from the outside positioned combustion catalyst layer.

Figure 6A:
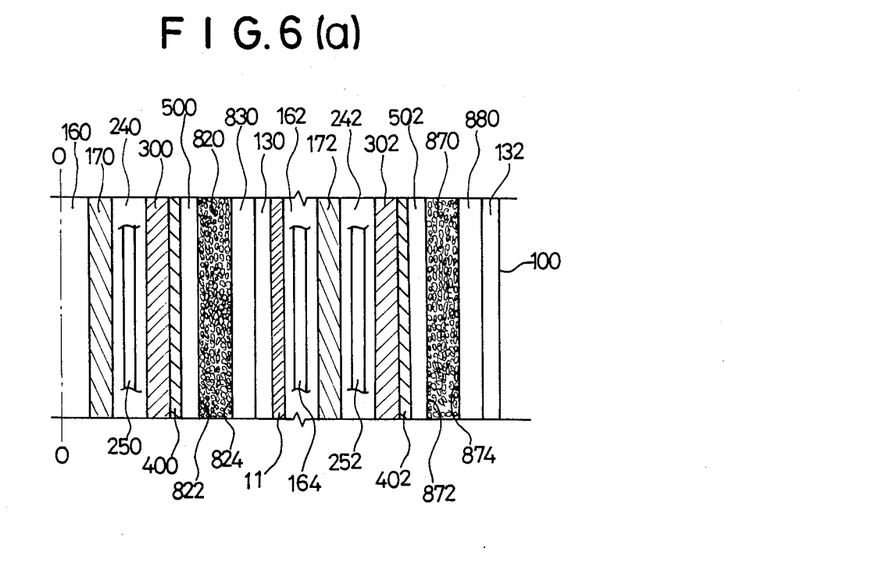
FIG. 6 shows partial vertical cross section of two embodiments with 6a for inner heating source 6b for outer heating source.
Figure 6B:
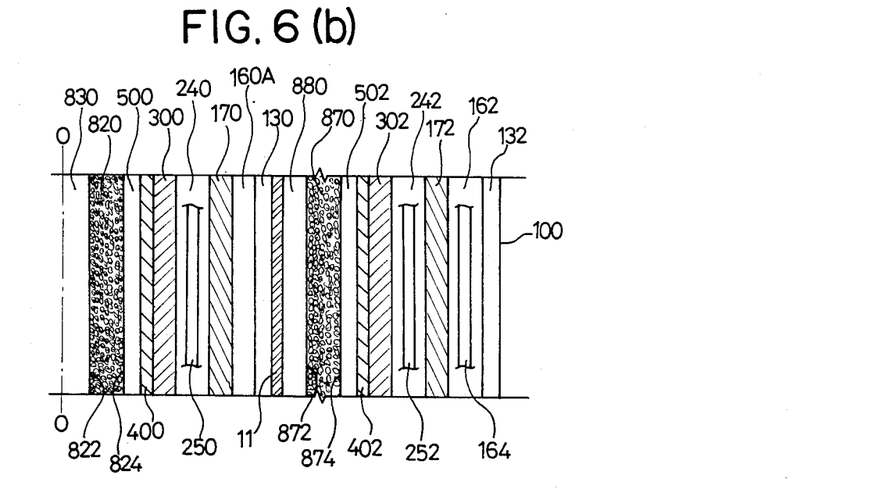

Referring to FIG. 6, showing partial vertical cross section of the apparatus of the invention, in FIG. 6a, alike the embodiment in FIG. 3, from the axis O—O of the cylindrical vessel 100 on the left to the vessel shell 100 on the right, rooms, walls, passages and the like are coaxially arranged: for the core unit, columnar oxygen containing gas supply room or space 160, gas permeable distribution pipe wall 170, gas mixing room 240 having therein fuel distribution pipes 250, gas permeable wall layer 300, combustion catalyst holding layer 400, flue gas passage room 500, inner reaction room wall 822, reaction room filled with catalyst bed 820, outer reaction room wall 824, product gas passage 830, oxygen containing gas rising passage 130, heat insulating wall 11; and for the annular unit, heat insulation wall 11, oxygen containing gas supply room 162 having therein gas permeable pre-distributor tube means 164, gas permeable cylindrical distribution wall 172, gas mixing room 242 having therein fuel gas distribution pipes 252, gas permeable wall layer 302, catalyst holding layer 402, flue gas passage room 502, inner reaction room wall 872, reaction room filled with catalyst bed 870, product gas passage 880, oxygen containing gas rising passage 132, and vessel shell 100; in the embodiment in FIG. 6b, on the contrary, the reaction catalyst beds 820 and 870 are heated from the combustion catalyst layers 400 and 402 on the outside, respectively, and the arrangement is, from the vessel shell 100 to the central axis O—O on the left: for the annular unit, vessel shell 100, oxygen containing gas passage 132, oxygen containing gas supply room 162 having therein pre-distributor tubes 164, distribution wall 172, gas mixing room 242 having therein fuel gas distribution pipes 252, gas permeable wall layer 302, catalyst holding layer 402, flue gas passage room 502, outer reaction room wall 874, reaction room having therein catalyst bed 870, reaction room inner wall 872, product passage 880, and heat insulation wall 11; and for the core unit, heat insulating wall 11, oxygen containing gas passage 130, annular oxygen containing gas supply room 160A which may have therein pre-distribution tubes as in the supply room 162, gas permeable cylindrical wall 170, gas mixing room 240 having therein fuel gas distribution tubes 250, gas permeable wall layer 300, catalyst holding layer 400, flue gas passage room 500, reaction room outer wall 824, reaction room provided therein with catalyst bed 820 in granules, inner reaction room wall 822, and product passage 830 which is a columnar central room.

Though omitting the annular upward passages 130, 132 and horizontal passages which may be accompanied as in passages 120, 122; 140, and 142 in FIG. 3 is possible and reasonable in the embodiment in FIG. 6b, the upward passages 130 and 132 are added in FIG. 6b for a simple comparison with the embodiment in FIG. 6a.

In order to save the space, the oxygen-containing gas pre-distributor means 164 provided in the oxygen containing gas supply room may be omitted. In such cases including the columner supply room 160 and the annular supply room 160A, if some control of gas permeability distribution of walls 170 or 172 along the longitudinal or vertical direction is required, certain variations of the porosity distribution may be effective including an adoption of additional wall as already mentioned.

Such control is achieved by adjusting the porosity of pre-distributor means and/or the same of the gas permeable distribution wall such as 172 or 170, too.

Figure 7:
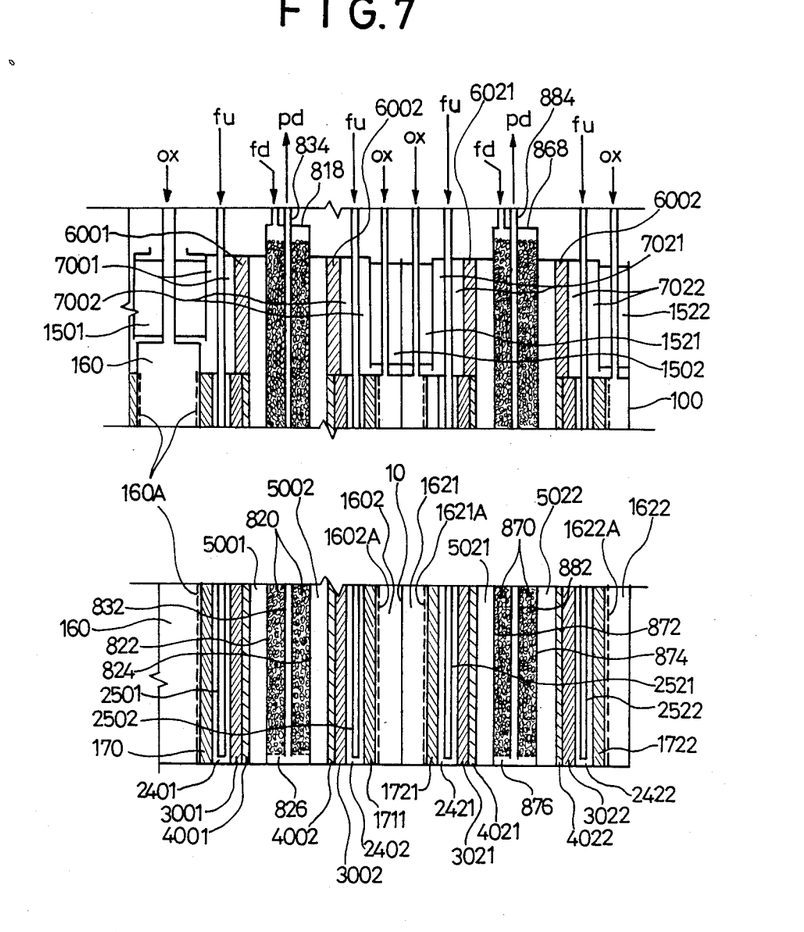
FIG. 7 shows an embodiment in partial brief vertical cross section, having two reaction room both of which are provided with respective inner and outer catalyst holding walls.

FIG. 7 shows an embodiment having two annular reaction rooms 818 and 868 both of which are heated from inner and outer catalyst layers.

Oxygen-containing gas referred to as "ox" passes through the tube side of the finned tube heat exchangers 1501, 1502, 1521 and 1522 into supply rooms 160, 1602, 1621 and 1622 respectively, having no pre-distributor means therein but having additional walls as will be mentioned below for favorable distribution of the gas penetration, along the vertical direction, then through additional walls 160A, 1602A, 1621A and 1622A respectively, and walls 170, 1711, 1721 and 1722, respectively into mixing rooms 2401, 2402, 2421 and 2422 respectively, where the gas is mixed with the fuel gas, referred to as "fu" and spouted out of the fuel gas distribution pipes 2501, 2502, 2521 and 2522 respectively to form a gas mixture, then the mixture goes through the wall layers 3001, 3002, 3021 and 3022, respectively, and the catalyst holding layers 4001, 4002, 4021 and 4022 respectively into the flue gas passage rooms 5001, 5002, 5021 and 5022 respectively while the fuel is burnt in the combustion catalyst layers to give a flue gas.

The heat generated in the catalyst holding layers 4001, 4002, 4021 and 4022 is radiated therefrom onto the reaction room walls 822, 824, 872 and 874 respectively. Then the heat is transmitted to the reaction catalyst beds 820 and 870 in the reaction rooms 818 and 868 respectively, through the core unit reaction room walls 822 and 824 and the annular unit reaction room walls 872 and 874 respectively.

The flue gas goes through the passage rooms 5001, 5002, 5021 and 5022 respectively, heat recovery walls 6001, 6002, 6021 and 6022 respectively, then through annular rooms 7001, 7002, 7021 and 7022 respectively, and through the fin side of the finned tubes 1501, 1502, 1521 and 1522 respectively, giving the residual heat to oxygen containing gas coming down through the tube side, and then is discharged upward out of the heat exchangers.

The raw material feed gas for steam reforming, a mixture of hydrocarbon gas and steam, for instance, referred to as "fd" comes down through the steam reforming catalyst beds 820 and 870 becoming a product gas which is referred to as "pd" in the drawing, and through the openings 826 and 876 at the bottom of the reaction rooms respectively, then turns into the product gas passages 832 and 882 respectively, and goes up therethrough giving the residual heat to the reactant gas countercurrently passing the respective reaction rooms and is drawn out of the pipes 834 and 884 respectively which are the fingers of the collecting manifolds not illustrated in the drawing.

Figure 8A:
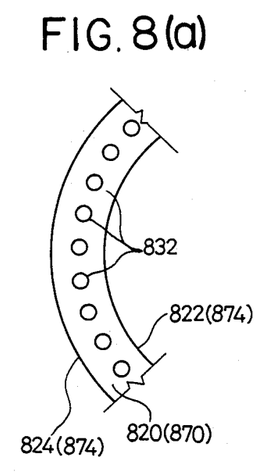
FIG. 8, a-c shows brief partial horizontal cross section of the reaction room to illustrate preferable forms of the product gas passage coming up through the reaction room.
Figure 8B:
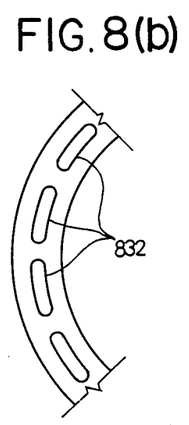
Figure 8C:
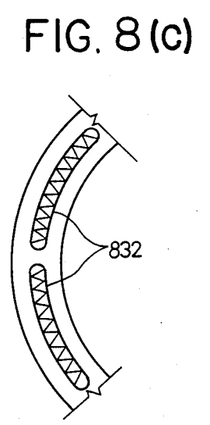

The product gas passages 832 and 882 may be vertical circular pipes disposed along a concentric circle between the inner and outer circular reaction room walls 822, 824; 872, and 874 on the horizontal cross section of the apparatus, and may be flat tubes or plate-fin type tubes of arc or short straight line shaped horizontal cross section as shown in FIG. 8 (a: circular tube; b: flat tube in arc; c: plate-fin in arc).

Figure 9:
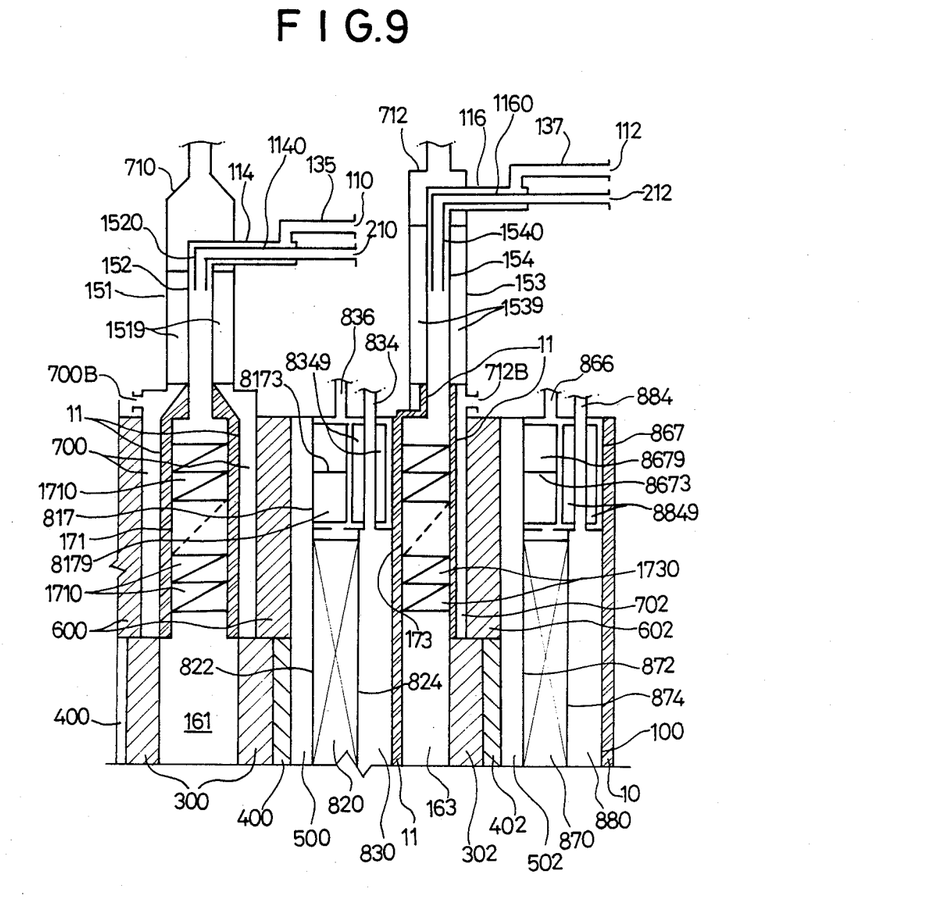
FIG. 9 illustrates an embodiment similar to that of FIG. 3 but with different static gas mixing means.

Referring to FIG. 9 showing a brief partial vertical cross section of an embodiment wherein a static mixing means 171 and 173 consisting of static mixing units 1710 and 1730 piled in series respectively is provided instead of coaxially piled set of oxygen containing gas supply room 170 and mixing room 240 such as in FIG. 1.

Oxygen containing gas introduced from inlet nozzles 110 and 112 goes into side tubes 135 and 137 respectively, the outer tubes 114 and 116 respectively double tubed in combination with inner tubes 1140 and 1160 respectively, turns down into vertical outer tubes 152 and 154 respectively having fins 1519 and 1539 respectively on the outer surface and constituting heat exchangers 151 and 153 respectively, then gets together with the fuel gas from inner tubes 1520 and 1540 respectively.

The fuel gas is supplied from the inlet 210 and 212, goes through inner tubes 1140 and 1160 respectively, then passes down through the vertical inner tubes 1520 and 1540 respectively, which are coaxial with outer tubes 152 and 154 respectively, to meet the oxygen containing gas within the outer tubes.

The two gases comes down through the lower part of the vertical outer tubes 152 and 154 and static mixing means 171 and 173 respectively getting to a mixed gas into the mixed gas distribution rooms 161 for the core unit and 163 for the annular unit respectively.

Then the mixed gas passes through gas permeable wall layer 300 and 302 respectively, then catalyst holding layers 400 and 402 respectively, into flue gas passage rooms 500 and 502, burning to become a flue gas and generating heat in catalyst layers 400 and 402, which heat is transmitted into the reaction catalyst beds 820 and 870 respectively, through passage rooms 500 and 502 respectively and reaction room walls 822 and 872 respectively; and the flue gas goes up through rooms 500 and 502 giving residual heat to the reaction catalyst bed, and passes through heat recovery gas permeable walls 600 and 602 respectively, which walls radiate the heat onto the reaction room walls 822 and 872 respectively and their upper extensions having fins 8179 and 8679 on the opposite side respectively, with baffles 8173 and 8673 respectively to give the heat to the feed gas passing the fin side, then comes through annular rooms 700 and 702 respectively, fin-side of heat exchangers 151 and 153 respectively, and discharge ducts 710 and 712 to the outside.

The heat recovered by fins 1519 and 1539 is given to the pre-mixture of the fuel and oxygen containing gases in tubes 152 and 154 respectively. Certain portion of the flue gas is drawn out from the bypassing outlets 700B and 712B in order not to heat up the fuel gas mixture up to the ignition point, keeping the temperature of the mixture low enough.

The fuel gas mixture should also as well be kept off from the spark caused by static charge or the like to avoid ignition; safety precaution such as earthing, grounding, etc. are required for this purpose.

Further, backfire prevention means should be applied.

These safety precaution means are recommended to be provided doubly or more.

Referring back to FIG. 9, raw material feed gas fed from pipes 836 and 866 passes between upper portions of fins 8179 and 8679 respectively, between fins 8349 and 8849 respectively, and between lower portions of fins 8179 and 8679 respectively, which lower portions are separated from the upper portions by baffles 8173 and 8673 respectively, then down into the reaction catalyst bed 820 and 870 respectively.

The raw material gas goes down through the beds 820 and 870 changing into a product which goes into and up through product passages 830 and 880 respectively, and through the tube side of the finned tubes provided with fins 8349 and 8849 respectively, pre-heating raw material gas mixture passing the fin side, and then the product is recovered through the pipes 834 and 884, respectively.

In FIG. 9, heat insulation walls 11 are provided between the core and annular units, between the room 700 and mixing means 171, and between the room 702 and mixing means 173. And the outer vessel shell 100 is clad with heat insulation material 10.

In the present invention, a mixture of fuel and oxygen containing gases may be fed to the apparatus for the best saving of the space occupied thereby, although prevention of gas explosion due to static spark, backfire or the like must be sufficiently and fully provided.

Figure 10:
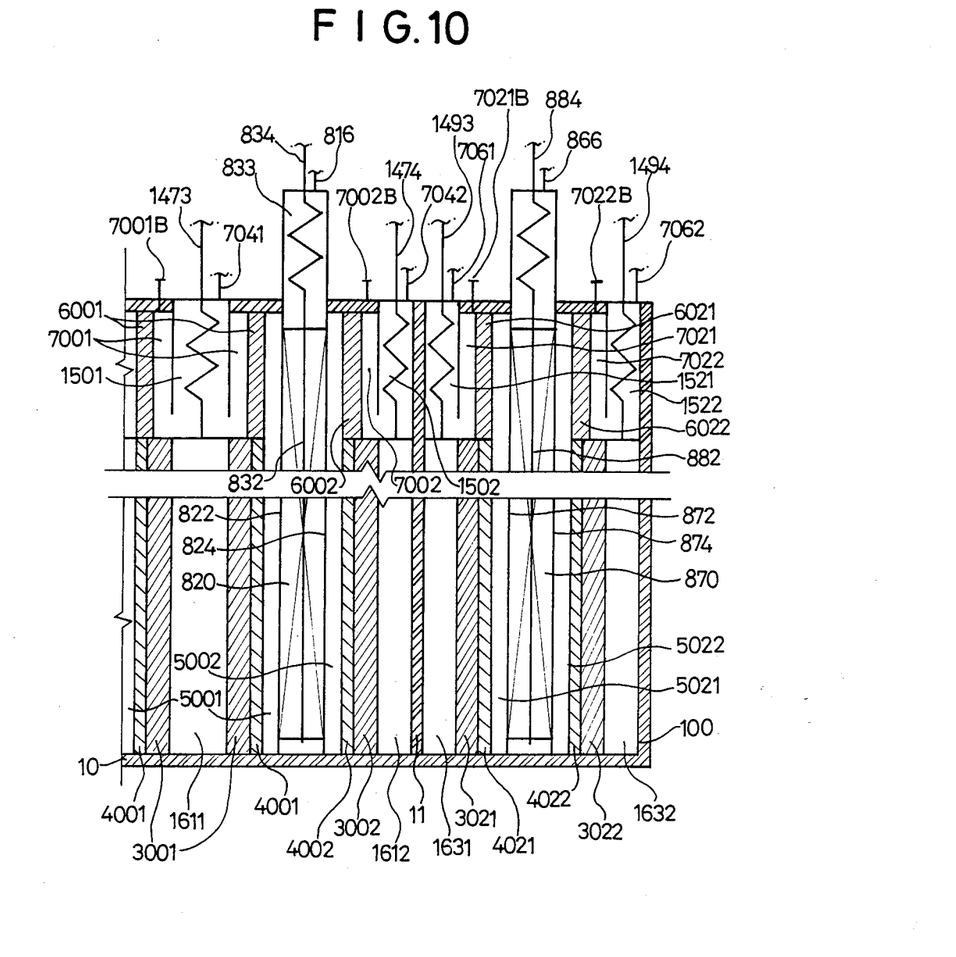
FIG. 10 shows an embodiment resembling the one in FIG. 7 but with no fuel gas mixing means.

An embodiment as such with two reaction rooms is shown in FIG. 10 in a simplified brief partial vertical cross section.

Fuel gas mixture is fed through lines 1473, 1474, 1493 and 1494, through tube side of heat exchangers 1501, 1502, 1521 and 1522 respectively into fuel gas mixture distribution rooms 1611, 1612, 1631 and 1632 respectively (the former two are for the core unit and the latter two are for the annular unit), therefrom passes through gas permeable wall layers 3001, 3002, 3021 and 3022 respectively, and combustion catalyst layers 4001, 4002, 4021 and 4022 respectively, becoming a flue gas and generating heat by catalytic combustion in catalyst layers, into flue gas passage rooms 5001, 5002, 5021 and 5022 respectively.

The flue gas goes up through the passage rooms and through the gas permeable heat recovery walls 6001, 6002, 6021 and 6022 into rooms 7001, 7002, 7021 and 7022 respectively, therefrom the flue gas may be bypassed out from bypassing nozzles 7001B, 7002B, 7021B and 7022B respectively, as occasion demands, then the flue gas passes the shell side of heat exchangers 1501, 1502, 1521 and 1522 respectively, giving the residual heat to the fuel gas mixture countercurrently passing the tube side, and discharged through lines 7041, 7042, 7061 and 7062 respectively.

Raw material feed gas is supplied via lines 816 for core unit and 866 for annular unit into the top space in reaction rooms over the endothermic reaction beds 820 and 870, respectively, filled with solid material with or without catalyst 820 and 870 respectively, pre-heated in that space by the product gas countercurrently passing through the coiled tubes or the like arranged in the space, then passes down through the beds 820 and 870 respectively, being subjected to the desired reaction turning into the product gas, then the same goes into and upward through passage means 832 and 882 respectively, giving residual heat to the reactant coming down through the beds 820 and 870, then after further giving the residual heat to the raw material gas in the top space over respective beds, the product gas is recovered from lines 834 and 884, respectively.

[Example]

Measurements depending on the apparatus shown in FIG. 1 are as follows in this Example.

The apparatus of the Example is that for the production of a gas for a fuel cell having an output of 50 KW.

| | | |
|---|---|---|
| Steam reforming catalyst | Ni (wt %) | 8.0 |
| " | volume (liter) | 50 |
| Active component of combustion catalyst | Pd (wt %) | 2.0 |
| Thickness of catalyst bed | (mm) | 10 |
| Feed hydrocarbon | volume ($Nm^3$/hr) | 10.6 |
| " | composition (vol %) | |
| | $CH_4$ | 88.5 |
| | $C_2H_6$ | 4.6 |
| | $C_3H_8$ | 5.4 |
| | $i-C_4H_{10}$ | 0.7 |
| | $n-C_4H_{10}$ | 0.8 |
| Added steam | amount (kg/hr) | 30.8 |
| (steam/carbon ratio) | | 3.0 |
| Oxygen-containing gas | volume ($Nm^3$/hr) | 148.1 |
| " | composition (vol %) | |
| | $N_2$ | 80.2 |
| | $O_2$ | 10.7 |
| | $H_2O$ | 9.1 |
| Fuel | volume ($Nm^3$/hr) | 23.1 |
| (lower calorific value 2,235 Kcal/$Nm^3$) | | |
| Product gas | volume ($Nm^3$/hr) | 69.8 |
| " | composition (vol %) | |
| | $CH_4$ | 3.28 |
| | $H_2$ | 48.36 |
| | CO | 8.55 |
| | $CO_2$ | 6.44 |
| | $H_2O$ | 33.37 |
| Temperature of gas passing through space 150 (°C.) | | 400 |
| Surface temperature of partition wall layer 300 at entrance side (°C.) | | 400 |
| Temperature of catalyst bed (°C.) | | 1,000 |
| Temperature of flue gas at inlet of heat-exchanger tube 150 (°C.) | | 807 |
| Flue gas from the apparatus | volume ($Nm^3$/hr) | 167.2 |
| Temperature of feed gas to gasification reaction chamber 818 (°C.) | | 400 |
| Temperature of product gas at outlet of gasification reaction chamber 818 (°C.) | | 780 |
| Temperature of product gas discharged from the apparatus (°C.) | | 600 |

What is claimed is:

1. An apparatus for an endothermic reaction of a gas comprising: a vertical cylindrical vessel and being provided therein;

an annular endothermic reaction room having two cylindrical walls coaxial with said vessel;

a gas permeable, cylindrical combustion catalyst holding wall holding a combustion catalyst holding layer on a side thereof which side faces said reaction room, which wall being adjacent to at least one of said cylindrical walls of said reaction room and coaxial with said vessel;

a flue gas passage room being an annular room enclosed by a wall which includes said at least one of said cylindrical walls of said reaction room and said combustion catalyst holding wall;

a product gas passage being in countercurrent heat exchange arrangement with said reaction room and connected to the same at an end thereof;

a fuel gas supply room being on a different side of said combustion catalyst holding wall from said flue gas passage room, and enclosed by a wall including said combustion catalyst holding wall;

raw material gas supply means connected to said reaction room at another end thereof;

fuel gas supply means and oxygen containing gas supply means both connected to said fuel gas supply room;

flue gas discharge means connected to said flue gas passage room; and product gas discharge means connected to said product gas passage, whereby a fuel gas and an oxygen-containing gas are supplied into said fuel gas supply room through said fuel gas supply means and oxygen containing gas supply means, respectively, thereafter said two gases pass through said combustion catalyst holding wall into said flue gas passage room and said fuel gas is burnt by said combustion catalyst; heat generated by said combustion is brought to said reaction room by radiation from said combustion catalyst holding layer through said flue gas passage room and said at least one of said walls of said reaction room; a flue gas made by said combustion is discharged through said flue gas passage room and said flue gas discharge means, and residual heat of said flue gas is also given to said reaction room through said at least one of said walls of said reaction room; and a raw material gas is supplied through said raw material gas supply means into said reaction room, passes therethrough and reacts endothermically to become a product gas, then said product gas is discharged through said product gas passage countercurrently with said raw material gas passing through said reaction room giving residual heat thereof to said raw material gas, and through said product gas discharge means.

2. An apparatus as claimed in claim 1, wherein said combustion catalyst holding wall faces said reaction room on one side thereof.

3. An apparatus as claimed in claim 1, wherein a pair of combustion catalyst holding walls are provided for said reaction room and each of said combustion catalyst holding walls faces said reaction room on each side thereof, respectively.

4. An apparatus as claimed in claim 1, wherein a plurality of reaction rooms are provided coaxially.

5. An apparatus as claimed in claim 1, wherein at least one annular part thereof is divided into a plurality of arc-shaped blocks by a plurality of division walls.

6. An apparatus as claimed in claim 1, wherein said fuel gas supply room is provided therein with mixing means for mixing said fuel gas and oxygen containing gas.

7. An apparatus as claimed in claim 1, wherein said apparatus is provided with mixing means for said fuel gas and oxygen containing gas between said fuel gas supply room and both of said fuel gas supply means and oxygen containing gas supply means.

8. An apparatus as claimed in claim 1, wherein a part of said wall enclosing said flue gas passage room at a downstream end thereof with regard to the flow of said flue gas is made of a gas permeable material through which wall said flue gas is discharged from said flue gas passage room, whereby residual heat of said gas is radiated back from said material reverse to said flow of said flue gas.

9. An apparatus as claimed in claim 1, wherein said reaction room is filled with a reaction catalyst for said endothermic reaction.

10. An apparatus as claimed in claim 1, said vessel being further provided with a further cylindrical gas permeable wall coaxial with said cylindrical vessel, which wall faces said combustion catalyst holding wall on a different side thereof from said combustion catalyst layer and is included by a wall enclosing an oxygen containing gas supply room which is coaxial with said vessel and connected to said oxygen containing gas supply means, and said fuel gas supply means being connected to a further annular room sandwiched by said further cylindrical wall and said combustion catalyst holding wall, said fuel gas supply room comprising said further annular room and said oxygen containing gas supply room, and said further annular room is provided with fuel gas distribution means for distributing the same therein along a vertical direction and in horizontal directions being connected to said fuel gas supply means, whereby said oxygen containing gas is supplied through said oxygen containing gas supply means into said oxygen containing gas supply room and passes through said further cylindrical wall into said further annular room; and said fuel gas is supplied through said fuel gas supply means and said fuel gas distribution means into said further annular room, mixed therein with said oxygen containing gas, and then a resulting mixed gas passes through said combustion catalyst holding wall.

11. An apparatus as claimed in claim 10, wherein said fuel gas distribution means comprises a plurality of pipes disposed in said further annular room with a longitudinal direction thereof being vertical and having a multitude of pores through a wall thereof, whereby said fuel gas is spouted out of said pipes through said pores into said further room.

12. An apparatus as claimed in claim 1, wherein said combustion catalyst contains at least one component selected from the group consisting of palladium, platinum, nickel and compounds thereof as an active component.

13. An apparatus as claimed in claim 1 wherein means for enlarging surface area is provided on the surface of said cylindrical wall of said reaction room.

14. An apparatus as claimed in claim 1, wherein a thickness of said flue gas passage room is in the range of 5–200 mm.

15. An apparatus as claimed in claim 1, wherein the thickness of said combustion catalyst holding layer is in the range of 1–40 mm.

16. An apparatus as claimed in claim 1, wherein the active component of said combustion catalyst is carried on a gas-permeable refractory body.

17. An apparatus as claimed in claim 1, wherein said combustion catalyst holding wall is made of a refractory insulating material.

18. An apparatus as claimed in claim 17, wherein the thickness of said combustion catalyst holding wall excluding said combustion catalyst layer is in the range of 0.5–20 mm.

19. An apparatus as claimed in claim 1, wherein an additional porous cylindrical wall is attached on a different side of said combustion catalyst holding wall from said combustion catalyst layer.

20. An apparatus as claimed in claim 1, wherein a heat-exchanger for recovering waste heat of said flue gas to said oxygen containing gas is equipped at a downstream end of said oxygen containing gas supply means.

* * * * *